Patented June 23, 1942

2,287,756

UNITED STATES PATENT OFFICE 2,287,756

CONDENSATION PRODUCT OF THE UREA-FORMALDEHYDE TYPE

Alfred Brookes, London, England, assignor, by mesne assignments, to American Cyanamid Company, New York, N. Y.

No Drawing. Application April 27, 1940, Serial No. 332,101. In Great Britain January 27, 1939

8 Claims. (Cl. 260—71)

Resinous condensation products of the urea-formaldehyde type are useful in industry for several purposes, for example, in the manufacture of moulding powders and glues.

To assist the hardening or setting of these materials it is common practice to add an accelerator comprising an acid or an acid-producing salt and this is usually added after the resin forming condensation has taken place. For instance, in the production of moulding powders, the resinous condensation product is mixed with a filler (for example, paper or wood meal) and dried, after which the material is ground and during this stage the accelerator is added. In the production of glues, the resinous condensation product is concentrated to a viscous mass, capable of being spread and the accelerator added, usually not more than a few hours before the glue is to be used.

According to one feature of this invention melamine is employed as an accelerator for the setting or hardening of condensation products of the urea-aldehyde type.

For example it may be incorporated in a moulding powder of the urea-aldehyde type in substitution for the whole or a part of the acid accelerator usually employed. Alternatively it may be used as a hardener for a glue of the urea-aldehyde type in place of the whole or part of the acidic hardener normally employed. Melamine may also be used as a further addition to accelerators of the acidic type.

It will be observed that melamine is a base and it has been found that it does not suffer from some of the disadvantages connected with the use of acidic accelerators. For example, when used in moulding powders, staining of the moulds is reduced and when used as a hardener for glues it may be added to the glue under suitable conditions as long as 48 hours before the glue is used.

Alternatively, salts of melamine may be employed. The salts may be added as such or formed in situ by the addition of an acid together with the melamine. Examples of suitable salts are melamine sulphate, oxalate, formate, acetate and hydrochloride. The salt may be used in addition to the base.

In place of melamine or its salts, mixed products containing the same may be used as an addition to, or in complete or partial replacement of, the usual acidic accelerators. Such a mixed product, consisting substantially of a mixture of melamine, melam, melem, mellon, and the like may be prepared by heating dicyandiamide. The corresponding salts produced by adding an acid to the mixture of bases may be employed. Likewise a mixture of such salts may be prepared by heating of ammonium thiocyanate, the product obtained being mainly melam thiocyanate.

While melamine is the preferred substance, the invention is not restricted thereto and is intended to include, as a further feature thereof, generally diazines or 1,3,5-triazines containing at least two amino groups or salts obtained from such diazines or triazines. Examples of suitable diazines and triazines, in addition to melamine, are: 1,4-diamino-phthalazine, 4,6-diamino-pyrimidine and 2,4-diamino-quinazoline. Mixtures of such materials may also be employed.

When it is desired to prepare a glue the said accelerator or mixture of accelerators may be used as a hardener in conjunction with a viscous liquid product of the condensation of urea and an aldehyde to form a glue. The glue so obtainable may be employed in the manufacture of composite or built up materials or products, e. g. plywood, by adhesively uniting layers, pieces or particles of the materials with the glue.

The following are illustrative examples of carrying the invention into effect, the parts and percentages being by weight.

Example 1

324 parts of 40% commercial formalin of a pH value of about 4.5 to 5 due to the presence of a small amount of formic acid are heated to boiling and 120 parts of urea, dissolved in about an equal weight of water, are added. The mixture is maintained in ebullition until a sample remains clear on cooling but precipitates insoluble resin on dilution with water. The solution is then neutralised by the addition of caustic soda, cooled and then concentrated in vacuo to a viscous spreadable glue which can be stored and remains usable for several months.

Prior to use 100 parts of glue are mixed with 10 parts of melamine, previously ground to an impalpable powder. The mixture is spread on sheets for the production of plywood and hot pressed at about 95°–110° C. for 10–20 minutes at a pressure of about 200 lbs. per square inch.

The mixture may be used in the production of film glue by application to a paper carrier in a known manner and drying in a current of warm air at about 60° C.

Example 2

324 parts of 40% commercial formalin are neutralised by addition of a buffer salt or a fixed alkali such as caustic soda and heated to boiling with 120 parts urea. While still boiling, the solution is brought to about pH4 by addition of formic acid and then heated further until a sample remains clear on cooling but precipitates resin on dilution with water. The solution is then neutralised by addition of alkali and a further 40 parts of urea are added and dissolved. The resin solution is then evaporated to a viscous spreadable glue which can be stored.

Prior to use 100 parts of the glue are mixed with 10 parts of melamine, previously ground to an impalpable powder.

Example 3

A glue is prepared by condensation of urea and formaldehyde by either of the methods described in the previous examples. Prior to use the glue is mixed with 10% melamine formate.

The mixture is spread on sheets for the production of plywood and hot-pressed as described in Example 1, except that a pressing time of 5 minutes suffices.

Example 4

A glue is prepared by condensation of urea and formaldehyde according to either of the methods described in Examples 1 and 2. Prior to use, the glue is mixed with 5–15% crude melam thiocyanate obtained by heating ammonium thiocyanate for about 40 to 50 hours at a temperature rising to about 275° C.

Example 5

A glue is prepared by condensation of urea and formaldehyde according to either of the methods described in Examples 1 and 2. Prior to use the glue is mixed with 10–15 parts of the crude mixture of melamine, melam, etc. obtained by the fusion of dicyandiamide, together with 1–2 parts of tartaric acid which materials have preferably been previously ground together to an impalpable powder.

Example 6

A moulding powder is made by any of the well known methods from a resinous urea-formaldehyde condensation product and a filler. In the last stages of grinding there is incorporated 2–4% of a melamine salt such as melamine formate or acetate, the proportion being calculated on the resin.

Example 7

A moulding powder is prepared from a resinous urea-formaldehyde condensation product and a filler. After drying and grinding, it is further milled with 10–20% of melamine calculated on the resin.

Example 8

A moulding powder is prepared from a resinous urea-formaldehyde condensation product and a filler. After drying and grinding, it is milled with 5–15% of melamine and 1–5% of a melamine salt such as melamine hydrochloride, formate or acetate, the proportions being calculated on the resin.

As indicated in the foregoing examples the proportions of the hardening accelerator are calculated on the resin and the same basis of calculation is used in the claims.

What I claim is:

1. A hardenable urea-formaldehyde condensation product mixed with about 10% of melamine.

2. A hardenable urea-formaldehyde condensation product mixed with 2–5% of a melamine salt.

3. A hardenable urea-formaldehyde condensation product mixed with 2–5% of melamine acetate.

4. A hardenable composition comprising a urea-formaldehyde condensation product and a hardening accelerator including about 2–20% of a substance selected from the group consisting of melamine, 1,4-diamino-phthalazine, 4,6-diamino-pyrimidine, 2,4-diamino-quinazoline, melamine containing mixtures produced by the heat treatment of dicyandiamide and their salts and the products obtained by the heat treatment of ammonium thiocyanate.

5. A hardenable urea-formaldehyde condensation product mixed with from about 2–20% of melamine.

6. A hardenable urea-formaldehyde condensation product mixed with from about 2–20% of a melamine salt.

7. A process for hardening a urea-formaldehyde condensation product which includes heating a hardenable urea-formaldehyde condensation product mixed with a hardening accelerator including about 2–20% of a substance selected from the group consisting of melamine, 1,4-diamino-phthalazine, 4,6-diamino-pyrimidine, 2,4-diamino-quinazoline, melamine containing mixtures produced by a heat treatment of dicyandiamide and their salts and the products obtained by the heat treatment of ammonium thiocyanate.

8. A process for the manufacture of a hardenable resinous condensation product which includes the step of adding about 2–20% of at least one substance selected from the group consisting of melamine, 1,4-diamino-phthalazine, 4,6-diamino-pyrimidine, 2,4-diamino-quinazoline, melamine containing mixtures produced by a heat treatment of dicyandiamide and their salts and the products obtained by the heat treatment of ammonium thiocyanate to a viscous liquid obtained by condensing urea and aqueous formaldehyde.

ALFRED BROOKES.